United States Patent
Nielsen

(10) Patent No.: US 9,223,297 B2
(45) Date of Patent: Dec. 29, 2015

(54) SYSTEMS AND METHODS FOR IDENTIFYING A USER OF AN ELECTRONIC DEVICE

(71) Applicant: Christen V. Nielsen, Palm Harbor, FL (US)

(72) Inventor: Christen V. Nielsen, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 137 days.

(21) Appl. No.: 13/781,236

(22) Filed: Feb. 28, 2013

(65) Prior Publication Data

US 2014/0240092 A1      Aug. 28, 2014

(51) Int. Cl.
  *G06F 7/04*   (2006.01)
  *G05B 1/00*   (2006.01)

(52) U.S. Cl.
  CPC ........................................ *G05B 1/00* (2013.01)

(58) Field of Classification Search
  CPC .................................................... G06F 21/36
  USPC ........................................ 340/5.81; 345/633
  See application file for complete search history.

(56) References Cited

U.S. PATENT DOCUMENTS

| | | | |
|---|---|---|---|
| 6,400,996 B1 | 6/2002 | Hoffberg et al. | |
| 6,783,459 B2 * | 8/2004 | Cumbers | 463/29 |
| 6,839,072 B2 | 1/2005 | Trajkovic et al. | |
| 6,850,252 B1 | 2/2005 | Hoffberg | |
| 7,236,156 B2 | 6/2007 | Liberty et al. | |
| 7,373,820 B1 | 5/2008 | James | |
| 7,479,949 B2 | 1/2009 | Jobs et al. | |
| 7,505,921 B1 | 3/2009 | Lukas et al. | |
| 7,716,054 B2 | 5/2010 | Harris et al. | |
| 7,733,224 B2 | 6/2010 | Tran | |
| 7,859,521 B2 | 12/2010 | Hotelling et al. | |
| 8,049,756 B2 | 11/2011 | Shuster | |
| 8,432,366 B2 | 4/2013 | Hodges et al. | |
| 8,473,975 B1 | 6/2013 | Besehanic | |
| 8,869,183 B2 | 10/2014 | Besehanic | |
| 2003/0179229 A1 | 9/2003 | Van Erlach et al. | |
| 2004/0203850 A1 | 10/2004 | Oesterling | |
| 2004/0239639 A1 | 12/2004 | Stavely et al. | |
| 2005/0212755 A1 | 9/2005 | Marvit | |
| 2006/0247915 A1 | 11/2006 | Bradford et al. | |
| 2007/0180469 A1 | 8/2007 | Finley et al. | |

(Continued)

FOREIGN PATENT DOCUMENTS

| | | |
|---|---|---|
| EP | 2133777 | 12/2009 |
| WO | 0211123 | 2/2002 |

OTHER PUBLICATIONS

United States Patent and Trademark Office, "Non-Final Office action," issued Aug. 19, 2014 in connection with U.S. Appl. No. 13/409,796 (24 pages).

(Continued)

*Primary Examiner* — Vernal Brown

(74) *Attorney, Agent, or Firm* — Hanley, Flight and Zimmerman, LLC

(57) ABSTRACT

Systems and methods for identifying a user of an electronic device are disclosed. An example method includes capturing body characteristic data associated with a user via a sensor on a computing device. The body characteristic data is captured as the user interacts with the computing device for a purpose different from user identification. The example method includes determining an identifier associated with the user based on the captured body characteristic data.

28 Claims, 8 Drawing Sheets

(56) References Cited

U.S. PATENT DOCUMENTS

| | | |
|---|---|---|
| 2007/0271518 A1 | 11/2007 | Tischer et al. |
| 2007/0294705 A1 | 12/2007 | Gopalakrishnan et al. |
| 2008/0086533 A1 | 4/2008 | Neuhauser et al. |
| 2008/0091451 A1 | 4/2008 | Crystal |
| 2008/0091762 A1 | 4/2008 | Neuhauser et al. |
| 2008/0109295 A1 | 5/2008 | McConochie et al. |
| 2008/0249867 A1 | 10/2008 | Angell et al. |
| 2009/0012927 A1 | 1/2009 | Brooks et al. |
| 2009/0083129 A1 | 3/2009 | Pradeep et al. |
| 2009/0085877 A1 | 4/2009 | Chang et al. |
| 2009/0088204 A1 | 4/2009 | Culbert et al. |
| 2009/0097689 A1 | 4/2009 | Prest et al. |
| 2009/0099983 A1* | 4/2009 | Drane et al. .................. 706/12 |
| 2009/0128567 A1* | 5/2009 | Shuster et al. ............... 345/473 |
| 2009/0193052 A1 | 7/2009 | Fitzgerald et al. |
| 2009/0307633 A1 | 12/2009 | Haughay, Jr. et al. |
| 2010/0134655 A1 | 6/2010 | Kuroiwa |
| 2010/0225443 A1 | 9/2010 | Bayram et al. |
| 2010/0249538 A1 | 9/2010 | Pradeep et al. |
| 2010/0265204 A1 | 10/2010 | Tsuda |
| 2010/0279738 A1 | 11/2010 | Kim et al. |
| 2011/0004474 A1 | 1/2011 | Bansal et al. |
| 2011/0066383 A1 | 3/2011 | Jangle et al. |
| 2011/0156867 A1 | 6/2011 | Carrizo et al. |
| 2011/0181422 A1 | 7/2011 | Tran |
| 2011/0279228 A1 | 11/2011 | Kumar |
| 2012/0033594 A1 | 2/2012 | Kalbag |
| 2012/0081392 A1* | 4/2012 | Arthur ......................... 345/633 |
| 2012/0083668 A1 | 4/2012 | Pradeep et al. |
| 2012/0200391 A1 | 8/2012 | Sugiyama et al. |
| 2012/0278377 A1 | 11/2012 | Weissman et al. |
| 2012/0284332 A1 | 11/2012 | Pradeep et al. |
| 2012/0306758 A1 | 12/2012 | Marsden et al. |
| 2013/0102283 A1 | 4/2013 | Lau et al. |
| 2013/0135218 A1 | 5/2013 | Jain et al. |
| 2013/0205311 A1 | 8/2013 | Ramaswamy et al. |
| 2013/0205360 A1 | 8/2013 | Novak et al. |
| 2013/0222277 A1 | 8/2013 | O'Hara |
| 2013/0232142 A1 | 9/2013 | Nielsen et al. |
| 2015/0012927 A1 | 1/2015 | Besehanic |

OTHER PUBLICATIONS

United States Patent and Trademark Office, "Non-Final Office action," issued Jul. 30, 2014 in connection with U.S. Appl. No. 13/307,599 (18 pages).

United States Patent and Trademark Office, "Final Office action," issued Aug. 14, 2014 in connection with U.S. Appl. No. 13/473,361 (17 pages).

International Search Report and Written Opinion, International Application No. PCT/US12/67049 dated Mar. 25, 2013.

United States Patent and Trademark Office, "Non-Final Office action," issued Mar. 31, 2014 in connection with U.S. Appl. No. 13/473,361 (11 pages).

United States Patent and Trademark Office, "Final Office action," issued Mar. 14, 2014 in connection with U.S. Appl. No. 13/409,796 (21 pages).

United States Patent and Trademark Office, "Non-Final Office action," issued Jul. 17, 2013 in connection with U.S. Appl. No. 13/409,796 (20 pages).

United States Patent and Trademark Office, "Final Office Action," issued in connection with U.S. Appl. No. 13/307,599, on Feb. 23, 2015, 44 pages.

United States Patent and Trademark Office, "Advisory Action," issued in connection with U.S. Appl. No. 13/473,361, on Nov. 10, 2014, 11 pages.

United States Patent and Trademark Office, "Non-Final Office Action," issued in connection with U.S. Appl. No. 13/473,361, on Feb. 12, 2015, 36 pages.

United States Patent and Trademark Office, "Non-Final Office Action", issued in connection with U.S. Appl. No. 13/307,599 on Jun. 19, 2015, 40 pages.

* cited by examiner

US 9,223,297 B2

SYSTEMS AND METHODS FOR IDENTIFYING A USER OF AN ELECTRONIC DEVICE

FIELD OF THE DISCLOSURE

This patent relates generally to audience measurement, and, more particularly, to systems and methods for identifying a user of an electronic device.

BACKGROUND

Audience measurement of media, such as television, radio, and/or Internet content or advertisements, is typically carried out by monitoring media exposure of panelists that are statistically selected to represent particular demographic groups. Using various statistical methods, the collected media exposure data is processed and extrapolated to determine the size and demographic composition of the overall audience(s) of the media (e.g., content and/or advertisements). The audience size and demographic information is valuable to advertisers, broadcasters and/or other entities. For example, audience size and demographic information is a factor in the placement of advertisements, as well as a factor in valuing commercial time slots during particular programs and/or content.

In recent years, methods of accessing media via the Internet, for example, have evolved. For example, Internet media was formerly primarily accessed via computer systems such as desktop and laptop computers. Recently, handheld devices (e.g., smartphones and tablets such as the Apple® iPad) have been introduced that allow users to request and view Internet media via a wireless access network.

DETAILED DESCRIPTION

Figure 1:
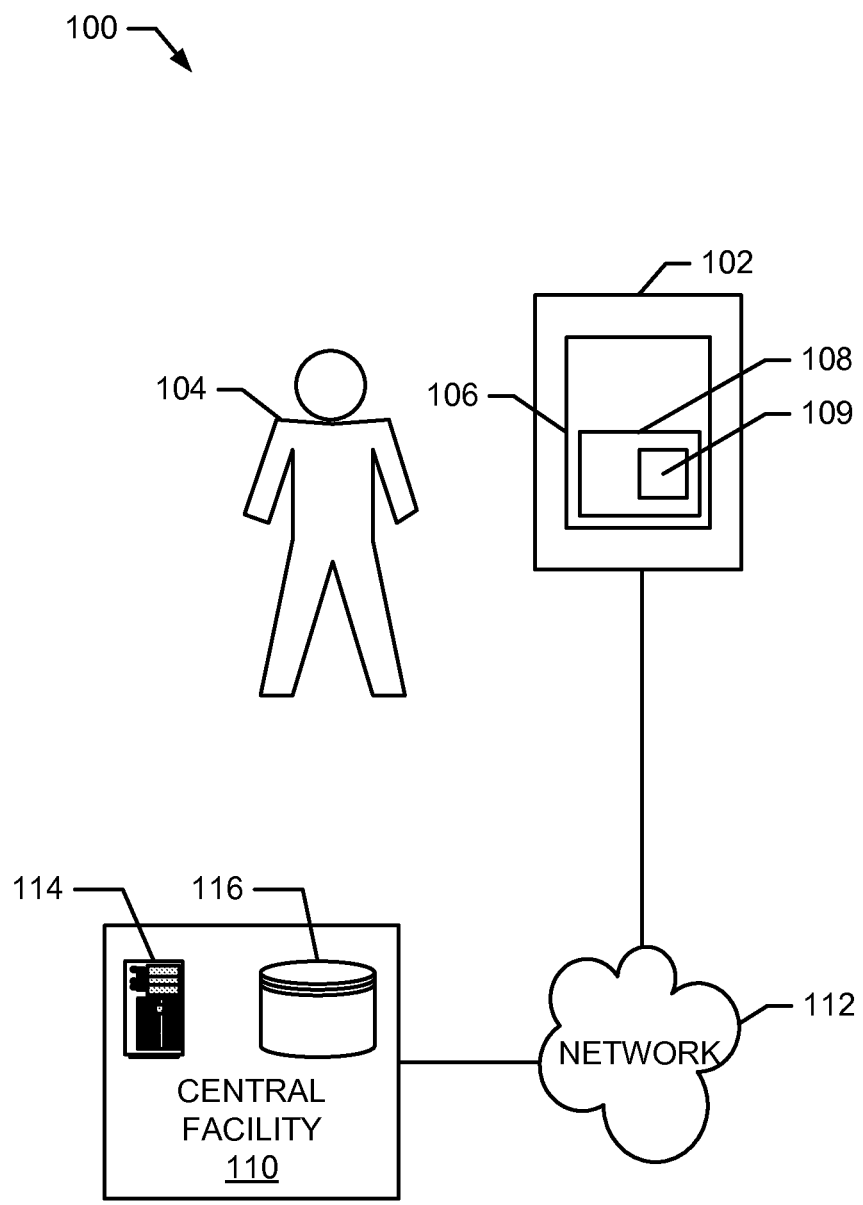
FIG. 1 illustrates an example system to monitor computing device activity and identify users of the computing device.

Advertisers, manufacturers, content providers, and/or audience measurement companies desire to gain knowledge on how users interact with their handheld computing devices such as smartphones and tablets. To gain such knowledge, audience measurement companies enlist persons to participate in audience measurement panels. Such persons agree to allow the audience measurement company to monitor activities on their computing devices (e.g., Internet traffic to and/or from the devices) to, for example, monitor exposure to media (e.g., content and/or advertisements), determine advertisement effectiveness, determine user behavior, identify purchasing behavior associated with various demographics, etc. Audience measurement data includes two primary components, namely, media identification data (e.g., data that identifies or can be used to identify media to which an audience was exposed), and people meter data (e.g., data that identifies or can be used to identify the person(s) in an audience). The people meter data is important because it enables the audience measurement entity to match demographics to the media identified by the media identification data.

People metering can be active or passive. In passive people metering, electronics are provided to automatically identify the user through, for example, facial recognition using video cameras. In active people metering, audience members are prompted to self-identify at various times. Such self-identification may involve pressing a button associated with the identity of the user or otherwise entering data (e.g., a user identifier) identifying the person(s) in the audience. Active people metering suffers from several shortcomings. For example, panelists may become wearied or irritated by the prompting and, thus, either fail to respond to a prompt and/or or drop out of the panel. In the context of computers such as personal computers, tablets, smart phones, etc., a panelist may log into the device to self-identify and then fail to log out. A second user may then begin utilizing the device, thereby misallocating the media exposures of the second user to the first user and introducing inaccuracies into the audience measurement data. This problem is particularly acute in the tablet context, where multiple members of a household may use the same tablet (e.g., Apple® iPad) at different times.

Example methods, systems, and/or computer readable storage media disclosed herein provide new techniques for passive people metering of devices with touchscreens such as phones and tablet computers. For instance, some disclosed example methods include capturing body characteristic data associated with a user via a sensor on a computing device. The body characteristic data is captured as the user interacts with the computing device for a purpose different from user identification. Some such disclosed example methods include determining an identifier associated with the user based on the captured body characteristic data.

Some example systems include a sensor to capture physiological data associated with a user. The physiological data is captured as the user interacts with the computing device for a purpose different from user identification. Some such example systems include a user identifier to determine an identifier associated with the user based on the physiological data.

Some disclosed example tangible computer-readable storage media include instructions that, when executed, cause a computing device to at least capture body characteristic data associated with a user via a sensor on a computing device. The body characteristic data is captured as the user interacts with the computing device for a purpose different from user identification. The instructions of some such examples cause the computing device to determine an identifier associated with the user based on the captured body characteristic data.

Example computing devices disclosed herein automatically identify a user so that the user may be associated with activity data (e.g., media identification data) collected during the user's interaction with the computing device. In disclosed examples, the identity of the user is determined as the user interacts with (e.g., touches) the computing device for a purpose different from user identification. Such examples enable passive user identification (e.g., the user is not required to actively identify himself). For example, a user's activities (e.g., websites visited, games played, media viewed, etc.) on a computing device are monitored and, as the user is involved in such activities, the identity of the user is determined with less need for repeatedly prompting the user and/or, in some examples, without prompting the user during the activity session.

In disclosed examples, users are registered. During registration, body characteristics and/or usage patterns of the user are captured on the computing device using a plurality of sensors. Body characteristics include, for example, heart rate(s), facial photograph(s) or image(s) (e.g., including one or more of eye spacing, head width and/or height, eye/nose/mouth ratios or geometry, hair styles, upper torso characteristics such as head shape, neck shape, head/neck/should ratios, shoulder profiles or characteristics, etc.), cough pattern(s), sneeze pattern(s), breathing pattern(s), etc. In some examples, a body characteristic may include a preferred seating position of the user. For example, the facial photograph(s) or image(s) may be analyzed (e.g., including a background of a photograph or image) to determine the preferred seating position of the user. Usage patterns include, for example, touch pressure(s), typing or stroke speed(s), typing or stroke acceleration(s) or deceleration(s), typing path(s), holding pattern(s), typing pattern(s), etc. The computing device stores these body characteristics and/or usage patterns in association with a user identifier. The body characteristics and/or usage patterns stored during registration are used to automatically identify the user as he/she operates the computing device. As the user uses the computing device, the computing device collects data related to the user's activities (e.g., media identification information) and also collects body characteristics and/or usage patterns of the user using the plurality of sensors. User identification logic on the computing device or on a remote computing device such as a server at the central facility of an audience measurement entity compares the collected body characteristics and/or usage patterns to the stored body characteristics and/or usage patterns to identify the user. The user identifier is associated with corresponding collected activity data (e.g., media identification data) and/or is sent to a collection facility for further processing.

FIG. 1 illustrates an example system 100 to monitor activity at a computing device 102 and/or to identify a user 104 of the computing device 102. In the illustrated example, the computing device 102 is provided with a software meter 108 to monitor and/or collect activity data (e.g., media identification data) related to, for example, Internet activity, application use, game play, messaging, etc. based on interaction of the user 104 with the computing device 102. Activity data may be, for example, media exposure data reflecting media (e.g., content, advertisements, applications, etc.) to which the user (e.g., the user 104) is exposed. Additionally, the meter 108 of the illustrated example is provided with user identification logic 109 to identify and/or to confirm the identity of a user (e.g., the user 104) of the computing device 102 based on body characteristics and/or usage patterns detected by the meter 108 so that the collected activity data is associated with the appropriate user.

In the illustrated example, the user 104 has volunteered, has been selected and/or has agreed to participate in an audience measurement process (e.g., the user 104 has agreed to the monitoring of his computing device 102 to collect activity data). In some examples, users (e.g., the user 104) may also agree to the monitoring of their media exposure activity within their homes (e.g., the monitoring of televisions, radios, computers, stereo systems, digital versatile disc (DVD) players, game consoles, etc.).

The computing device 102 of the illustrated example is a handheld device that is operated by the user 104 via a touchscreen 106. The computing device 102 may be any computing device that includes a touchscreen (e.g., a tablet (e.g., an Apple® iPad), a smartphone (e.g., an Apple® iPhone), etc.). Additionally or alternatively, the computing device 102 may be any device that operates using touchless touchscreen technology. Touchless touchscreen technology allows users to operate computing devices as they would with traditional touchscreens, but does not require users to actually touch the screens.

In the illustrated example, when the user 104 agrees to participate in the audience measurement process, the user 104 is asked and/or required to complete a registration process. During the registration process, the user 104 is prompted to enter a user identifier via the touchscreen 106. The user 104 may be asked and/or prompted via a display on the touchscreen 106, audible instructions output by a speaker, flashing lights, etc. The user identifier may be a name, an identification code (e.g., a series of letters and/or numbers), a birth date, and/or any alphanumeric other input that may be used to identify the user 104. Identifiers may be selected by users (e.g., the user 104) during registration or may be assigned to users by the audience measurement entity when they agree to participate in the audience measurement panel. Once the user 104 has entered the identifier, the user 104 is prompted to enter one or more body characteristics and/or usage patterns via the touchscreen 106. For example, the user 104 may be asked to input and/or provide a heart rate sample, a facial photograph, a cough, a sneeze, a breathing sample, a typing or other usage sample (e.g., from which usage patterns may be collected), etc. using the touchscreen 106 of the computing device 102 and/or the computing device 102. The computing device 102 of the illustrated example includes sensor(s) (e.g., located behind the touchscreen and sending data thru the touchscreen (or touchless screen) and/or within the computing device 102) to capture the body characteristics and/or usage patterns as the user 104 interacts with the computing device 102 (e.g., the touchscreen 106). In some examples, the body characteristics and/or usage patterns are not collected in response to requests for a sample, but instead are collected as the user operates the device and learned over time.

In some examples, the computing device 102 includes accelerometer(s), gyroscope(s), compass(es), image sensor(s), microphone(s), and/or cardiograph(s) to capture the heart rate of the user 104. In some examples, the computing device 102 creates a cardiogram to analyze the heart rate of the user 104. In some examples, the computing device 102 uses images of the eyes of the user 104 to analyze the heart rate of the user 104. In some examples, the computing device 102 includes image sensor(s) to capture facial shapes and/or facial photographs of the user 104. In some examples, the computing device 102 includes microphone(s) to capture audio of a cough and/or a sneeze of the user 104. For example, an audio signature of a cough and/or a sneeze may be created by the computing device 102. In some examples, the computing device 102 includes microphone(s), accelerometer(s), gyroscope(s), and/or compass(es) to capture involuntary movements, habitual movements, breathing rates and/or breathing patterns of the user 104. For example, an audio signature of a breathing sample may be created by the computing device 102. In some examples, the computing device 102 includes microphone(s), accelerometers(s), gyroscope(s), compass (es), and/or pressure sensor(s) to capture typing and/or usage samples of the user 104. The computing device 102 may analyze the captured typing and/or usage samples to determine touch pressure(s), typing or stroke speed(s), typing or stroke acceleration(s) or deceleration(s), typing path(s), holding pattern(s) (e.g., the user 104 holds the computing device 102 with his right hand and types with his left hand), and/or typing pattern(s) (e.g., the user 104 drags a second finger on the touchscreen 106 when typing with a first finger) associated with the user 104. Additional and/or alternative characteristics of the user 104 that may be collected by the computing device 102 are described in U.S. patent application Ser. No. 13/473,361, which is hereby incorporated by reference in its entirety.

Once the computing device 102 has collected body characteristic(s) and/or usage pattern(s) of the user 104, the computing device 102 stores the body characteristic(s) and/or usage pattern(s) in association with the identifier of the user 104. For example, the computing device 102 may store the identifier (e.g., an alphanumeric identifier unique to the user such as a username) along with the body characteristics (e.g., a heart rate, a heartbeat pattern, a facial shape, a facial photograph, an eye spacing, a head width and/or height, a eye/nose/mouth ratio or geometry, a hair style, an upper torso characteristics, a head shape, a neck shape, a head/neck/should ratio, a shoulder profile or characteristic, a cough pattern, a sneeze pattern, a breathing pattern, a tremor, a twitch, etc.) and/or usage patterns (e.g., a touch pressure, a typing or stroke speed, a typing or stroke acceleration and/or deceleration, a typing path, a holding pattern, a typing pattern, etc.) representative of the user 104. The registration process may be complete upon the association of body characteristic(s) and/or usage pattern(s) with an identifier of the user 104 or the registration process may include additional steps such as prompting the user to input demographic information, etc. The body characteristic(s) and/or usage pattern (s) of the user 104 are used by the computing device 102 to identify the user 104 as the user 104 interacts with the computing device 102 for other purposes (e.g., for a purpose different from user identification). Thus, the user is passively identified without the need for excessive prompting of the user to engage in self-identification (e.g., logging in).

Identifying the user 104 is important in the context of audience measurement to ensure that data collected on the computing device 102 is associated with the appropriate person (e.g., the person interacting with the computing device 102) and, thus, the correct demographics. Frequently, a computing device such as an iPad may be used by multiple members of a household at different times. In such examples, the computing device 102 collects activity data that is then associated with the corresponding member(s) of the household (e.g., the household member(s) interacting with the computing device 102). Identifying users by their body characteristic (s) and/or their usage pattern(s) as they interact with the computing device 102 facilitates such associations. Furthermore, capturing body characteristics and/or usage patterns of users as they interact with the computing device 102 for other purposes is a nonintrusive method for identifying users. Such nonintrusive methods are less reliant on user compliance and may increase the likelihood of a person agreeing to and/or continuing to participate in an audience measurement panel.

After or during the registration process, the panelist is provided with a meter to track usage activity on the computing device. The meter 108 of the illustrated example also collects data indicative of body characteristics. Moreover, the meter 108 collects usage pattern data. User identifier logic 109 of the meter 108 of the illustrated example identifies users of the computing device. In the illustrated example, the meter is a software meter 108 that is downloaded to the computing device to be monitored via, for example, the Internet. The meter 108 runs in the background of the monitored device to identify and record events/activities of interest occurring on the device. There are numerous manners of implementing meters to identify activities on a computing device. Any such technique of collecting activity data may be employed. For an example of a software meter monitoring activity on a computing device, see Coffey, U.S. Pat. No. 5,675,510, which is hereby incorporated by reference in its entirety. Methods of collecting activity data are, thus, beyond the scope of this disclosure and will not be discussed in great detail herein.

The software meter 108 of the illustrated example monitors activity of the user 104 on the computing device 102. The meter 108 of the illustrated example monitors, for example, Internet activity, data sent and/or received, games played, media viewed, applications downloaded, advertisements selected, etc. and stores and/or exports (e.g., collects) activity data (e.g., media identification data) representative of the user activity. As the meter 108 monitors these activities (e.g., as the user 104 operates the computing device 102), the meter 108 of the illustrated example also detects body characteristic(s) and/or usage patterns of the user 104. For example, as the user 104 types on the touchscreen 106 (or touchless screen) of the computing device 102 to, for example, perform an Internet search or interact with an application (e.g., an "app"), the meter 108 collects body characteristic data corresponding to heart rate(s), facial shape(s) (e.g., one or more of an eye spacing, a head width and/or height, a eye/nose/mouth ratio or geometry, a hair style, an upper torso characteristics, a head shape, a neck shape, a head/neck/should ratio, a shoulder profile or characteristic), facial image(s), cough pattern(s), sneeze pattern(s), breathing pattern(s), device holding pattern (s), tremors, etc. Body characteristic data is physiological data representative of one or more physiological characteristics of the user (e.g., the user 104) of the computing device 102. The example meter 108 also collects usage pattern data such as touch pressure(s), typing or stroke speed(s), typing or stroke acceleration(s) or deceleration(s), typing path(s), holding pattern(s), and/or typing pattern(s). The body characteristic data and/or the usage pattern data are collected using sensors within the computing device 102 (e.g., an image sensor, an accelerometer, a gyroscope, a compass, and/or any other sensor of the computing device 102). The meter 108 of the illustrated example collects body characteristic(s) and/or usage patterns of the user 104 continuously. However, in other examples, the meter 108 collects the body characteristic (s) and/or usage pattern(s) periodically, aperiodically, and/or upon detecting an occurrence of an event (e.g., after the computing device 102 has been powered on, after a new application has been opened, after the computing device 102 has been moved, etc.).

The example meter 108 of FIG. 1 includes user identification logic 109 to identify the user 104 by matching collected body characteristic data and/or usage pattern data with body characteristic and/or usage pattern data stored in the computing device 102 (e.g., data representative of body characteristics and/or usage patterns that was collected and associated with a user during the registration process and/or at a later time) and/or by matching usage pattern data with data representative of historical usage patterns stored in the computing device 102. The meter 108 of the illustrated example associates collected activity data (e.g., media identification data) with the identified user 104 and/or exports the collected activity data and the user identification data to a central facility 110 for further processing. In the illustrated example, the collected activity data and/or the user identifier data (e.g., user identifiers, body characteristic data, and/or usage pattern data) are timestamped and sent to the central facility 110 via the network 112. The timestamps facilitate matching users to activities and/or media and may also facilitate identifying the media.

The central facility 110 of the illustrated example collects and/or stores, for example, media exposure data (e.g., activity data), user identification data and/or demographic information that is collected by multiple media monitoring devices similar to, for example, the meter 108 running on the computing device 102. The multiple meters separately monitor multiple different users operating multiple different computing devices. The central facility 110 may be, for example, a facility associated with The Nielsen Company (US), LLC or any affiliate of The Nielsen Company (US), LLC. The central facility 110 of the illustrated example includes a server 114 and a database 116 that may be implemented using any suitable processor, memory and/or data storage apparatus such as that shown in FIG. 7.

The network 112 of the illustrated example is used to communicate information and/or data between the example computing device 102 and the central facility 110. The network 112 may be implemented using any type(s) of public and/or private network such as, but not limited to, the Internet, a telephone network (e.g., the plain old telephone service network (POTS)), a local area network (LAN), a cable network, and/or a wireless network. The computing device 102 may communicate with the network 112 using a wireless or wired connection. For example, the computing device 102 may include a communication interface that enables connection to an Ethernet, a digital subscriber line ("DSL"), a telephone line, a coaxial cable, and/or any wireless connection, etc.

Figure 2:
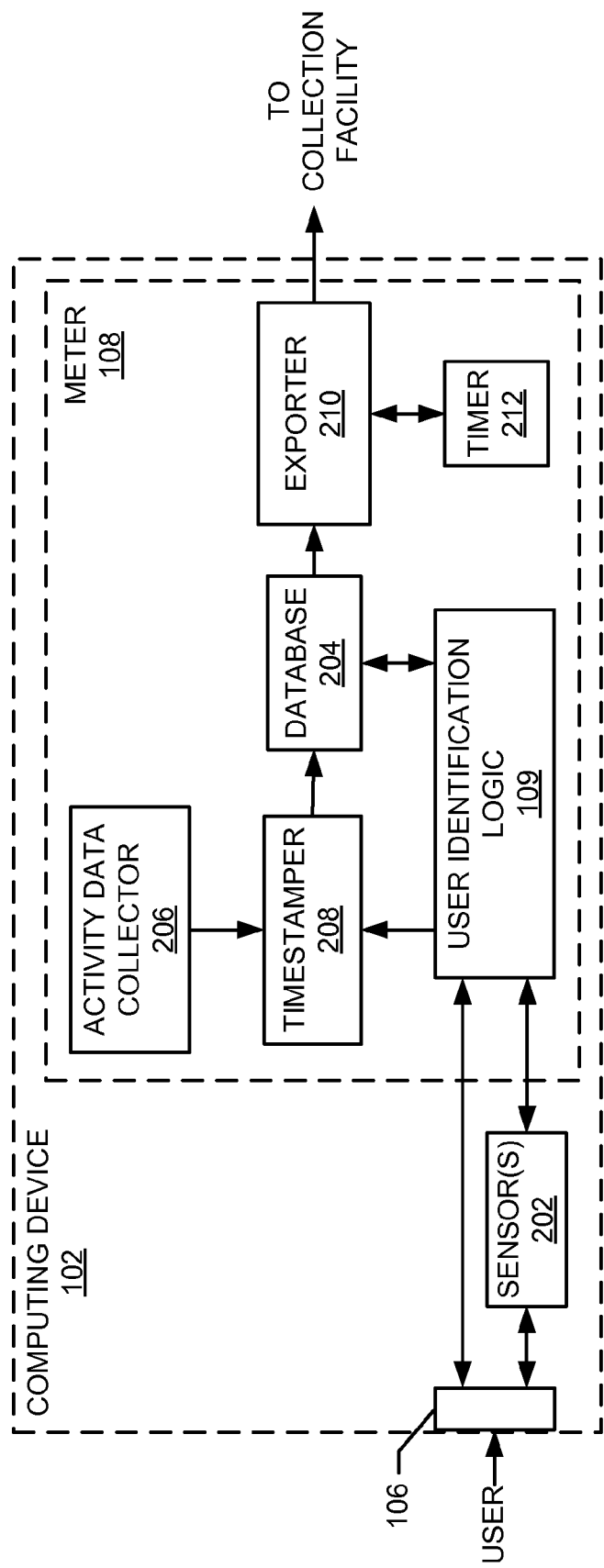
FIG. 2 illustrates an example implementation of the computing device of FIG. 1.

FIG. 2 is a block diagram of an example implementation of the example computing device 102 and the example meter 108 of FIG. 1. FIG. 2 focuses on the meter 108 and, thus, omits much of the hardware of the computing device 102. A more complete illustration of an example hardware configuration of the computing device 102 is discussed below in connection with FIG. 7. In the illustrated example, the meter 108 collects activity data representative of a user's interaction (e.g., the user 104) with the computing device 102 and of the media to which the user is exposed during that interaction. The meter 108 of the illustrated example also collects body characteristic data and/or usage pattern data corresponding to the time(s) the activity data is collected. The user identification logic 109 of the meter 108 of the illustrated example automatically identifies the user 104 associated with the activity data based on the body characteristic data and/or the usage pattern data collected as the user 104 interacts with the computing device 102. The body characteristic data and the usage pattern data collected for user identification is collected while the user operates the device for a purpose different from self-identifying (e.g., during normal usage of the device).

In the illustrated example, the computing device 102 includes the touchscreen 106 (or a touchless screen) and sensor(s) 202. The meter 108 includes the user identification logic 109, a database 204, an activity data collector 206, a timestamper 208, an exporter 210, and a timer 212.

The touchscreen 106 of the illustrated example allows the user 104 to operate the computing device 102 using touch. Touchscreens such as the touchscreen 106 are frequently used in computing devices (e.g., the computing device 102) as they allow for simple user interaction. The touchscreen 106 of the illustrated example is enhanced to include sensor(s) 202 behind and/or within the touchscreen 106 and/or the computing device 102 to allow the user identification logic 109 to collect data representative of body characteristic(s) and/or usage pattern(s) of the user 104 as the user 104 operates the computing device 102. The sensor(s) 202 may include any number and/or type(s) of sensors to capture a fingerprint, multiple fingerprints, a typing sample, a heart rate, a heartbeat, facial images, facial shapes, cough samples, sneeze samples, breathing samples, body temperatures, touch pressures, typing or stroke speeds, typing or stroke accelerations or decelerations, typing paths, device holding patterns, typing patterns, involuntary movements, tremors, habitual movements, etc. In some examples, the sensor(s) 202 include accelerometer(s), image sensor(s), cameras, microphone(s), pressure sensor(s), cardiograph(s), temperature sensor(s), etc. In some examples, where the sensor(s) 202 include image sensor(s) and/or a camera, some or all of the image sensor(s) and/or camera are placed behind the touchscreen 106 to capture the body characteristic data and/or the usage pattern data through at least one layer of the touchscreen 106. In some examples, the touchscreen 106 of the illustrated example is at least partly transparent to enable the sensor(s) 202 to enable capture of the body characteristic data and/or the usage pattern data through the screen.

The user identification logic 109 of the illustrated example is used to identify the user 104 based on the body characteristic data and/or the usage pattern data representative of the user 104 as the user 104 operates the computing device 102. In some examples, the user identification logic 109 undergoes a training process. In some such examples, the user identification logic 202 prompts the user 104 (e.g., via display on the touchscreen 106, audible instructions output by a speaker, flashing lights, etc.) to input a user identifier and/or a password. The identifier may be any alphanumeric data such as a name, an identification code (e.g., a series of letters and/or numbers), a birth date, and/or any other input that may be used to identify the user 104. The password, when used, may be any alphanumeric data. Username/password pairs are well known in the electronics arts and not described further.

Once the user 104 has entered the identifier and/or password via the touchscreen 106, the user identification logic 109 of the illustrated example prompts the user 104 to enter one or more body characteristics and/or facilitate collection of data representative of one or more body characteristics. For example, the user identification logic 109 of FIG. 1 prompts the user 104 to hold the device 102 in positions to facilitate collection of heart rate samples, heart beat samples, facial images or photographs, facial shapes, cough samples, sneeze samples, breathing samples, etc. The user identification logic 109 also prompts the user 104 to provide a typing sample and/or other usage sample. For example, the user identification logic 109 may prompt the user 104 to touch the screen in various ways, to type a sample sentence, to use a sample application, etc. The user identification logic 109 of the illustrated example analyzes the captured typing sample and/or other usage sample to determine usage pattern data to be associated with the user 104. For example, the user identification logic 109 of the illustrated example analyzes the typing sample and/or the usage sample to determine touch pressures, typing or stroke speeds, typing or stroke accelerations or decelerations, typing paths, device holding patterns, device orientation patterns, finger dragging, etc.

Once the user identification logic 109 of the illustrated example has collected body characteristic data and/or usage pattern data associated with the user 104, the user identification logic 109 sends the body characteristic data, usage pattern data, and/or the identifier/password entered by the user 104 to the database 204 for storage. The database 204 of the illustrated example stores the user identifier in association with the corresponding user body characteristic data and/or the usage pattern data. For example, the database 204 of the illustrated example stores an identification code along with body characteristic data representative of a heart rate pattern, a facial image, a facial shape, a cough pattern, a sneeze pattern, a breathing pattern, and/or other voluntary or involuntary movements, and/or with usage pattern data representative of touch pressures, typing or stroke speeds, typing or stroke accelerations or decelerations, typing paths, device holding patterns, and/or typing patterns representative of the user 104. Subsequently, the user identification logic 109 uses the body characteristic data and/or the usage pattern data to identify the user 104 as the user 104 interacts with the touchscreen of the computing device 102.

The activity data collector 206 of the illustrated example monitors activity of the user 104 on the computing device 102. The activity data collector 206 may monitor, for example, Internet activity (e.g., uniform resource locators (URLs) requested, web pages visited, etc.), data sent and/or received, games played, media viewed, applications downloaded, advertisements selected, etc. The activity data collector 206 of the illustrated example collects data related to the activity of the user 104 and passes the collected activity data to the timestamper 208. The timestamper 208 of the illustrated example timestamps the collected activity data and passes the timestamped data to the database 204 for storage.

Concurrently with the activity data collector 206 collecting the activity data, the user identification logic 109 detects body characteristic data of the user 104 and/or usage pattern data using the sensor(s) 202. For example, as the user 104 uses the touchscreen 106 of the computing device 102, the user identification logic 109 collects and/or determines a heart rate, a facial image, a facial shape, a cough pattern, a sneeze pattern, a breathing pattern, touch pressures, typing or stroke speeds, typing or stroke accelerations or decelerations, typing paths, holding patterns, and/or typing patterns (e.g., dragging a second finger when typing with a first finger, etc.) using the sensor(s) 202. For example, the computing device 102 may periodically and/or aperiodically collect a heart rate, a facial image, a touch pressure, a typing or stroke speed, a typing or stroke acceleration or deceleration, a typing path, a holding pattern, and/or a typing pattern. In some examples, the computing device 102 continuously records audio at the computing device 102 to detect if and/or when a user coughs and/or sneezes. In some such examples, the collected audio may be used by the computing device 102 to analyze breathing patterns associated with the user 104.

The user identification logic 202 of the illustrated example identifies the user 104 by matching collected body characteristic data and/or usage pattern data with body characteristic(s) and/or usage pattern(s) stored in the database 204 (e.g., body characteristics and/or usage patterns that were collected and associated with a user during the registration process and/or at a later date). The matching process may involve, for example, converting images into signatures and matching the signatures to reference signatures. In some examples, the matching process may involve representing image(s) as vectors and matching the vectors to reference vectors. In some examples, the matching process involves representing audio as signatures and matching the signatures to reference signatures. Any other representation and/or matching technology(ies) may additionally or alternatively be used.

In some examples, the user identification logic 109 includes a plurality of counters to identify the user 104. For example, once the user identification logic 109 has collected body characteristic data and/or usage pattern data, the user identification logic 109 determines if a collected heart rate is known. If a collected heart rate is substantially similar, for example, to a stored heart rate, the user identification logic 109 determines that the collected heart rate is known and increments a heart rate counter. In some such examples, the user identification logic 109 additionally determines if a facial image and/or facial shape is known. If a collected facial image and/or facial shape is substantially similar to a stored facial image and/or facial shape, the user identification logic 109 determines that the collected facial image and/or facial shape is known and increments a facial image counter and/or a facial shape counter. In some such examples, the user identification logic 109 additionally determines respiration characteristic(s) (e.g., a cough pattern, a sneeze pattern, a breathing pattern, etc.) of the user 104 and determines if the respiration characteristic(s) are known. If a determined respiration characteristic is substantially similar to a stored respiration characteristic, the user identification logic 109 determines that the determined respiration characteristic is known and increments a respiration characteristic counter. In some examples, the respiration characteristic counter is incremented for each respiration characteristic determined to be known. In some such examples, the user identification logic 109 additionally determines a typing and/or usage pattern of the user 104 and determines if the typing and/or usage pattern is known. A typing and/or usage pattern may include, for example, the concurrent detection of two or more of touch pressures, typing or stroke speeds, typing or stroke accelerations or decelerations, typing paths, holding patterns, typing patterns (e.g., dragging a second finger while typing with a first finger). If a determined usage pattern is substantially similar to a stored usage pattern, the user identification logic 109 determines that the determined usage pattern is known and increments one or more pattern counters for corresponding characteristics found to be matched. Additional and/or alternative characteristic(s) and/or pattern(s) and corresponding counters may be analyzed.

In the illustrated examples, once the user identification logic 109 has evaluated the collected body characteristic data and/or usage pattern data, the user identification logic 109 sums the counters of all characteristics and/or patterns. Once the user identification logic 109 sums the counters, the user identification logic 109 identifies the user 104 if more than a threshold number is exceeded. In some examples, separate sets of counters are monitored for each known user of the computing device 102. Thus, the identification logic 109 periodically sums the counters for the corresponding users and compares the summed values (e.g., user A has a summed counter value corresponding to the number of counter matches shown during a time period (e.g., one minute), user B has a second summed counter value corresponding to the number of counter matches identified over the second time period, etc). In such examples, the identification logic 109 identifies the user with the highest total summed counter value as the current user. Once such an identification is made, the counters are cleared (e.g., zeroed) and another round of matching/counting begins to again seek to identify the current user of the device 102. Continuously attempting to identify the user in this manner ensures a transition from usage of the device by a first user for usage of the device by a second user is quickly detected and recorded. In some examples, the counters are not cleared and rounds of matching/counting are subsequently implemented to identify users (e.g., previous users) of the device 102. Additional and/or alternative methods may be used to determine similarities between collected body characteristic data and/or usage pattern data and reference body characteristic data and/or usage pattern data to identify the user such as, for example, weighted input pattern recognition algorithms, fuzzy logic pattern recognition algorithms, etc.

Once the user identification logic 109 has identified the user 104, the user identification logic 109 passes the identifier of the user (e.g., a user name, identification code, number, birth date, etc.) to the timestamper 208. The timestamper 208 of the illustrated example timestamps the user identifier and passes the user identifier to the database 204 for storage.

The database 204 may associate collected activity data with the user identifier based on their respective timestamps and/or may pass the activity data and the user identifier separately to the exporter 210 to export the data to the central facility 110 for further processing and/or association. Collected activity data and/or user identifiers are sent to the central facility 110 via a network (e.g., the network 112 of FIG. 1).

The exporter 210 of the illustrated example uses a timer 212 to determine when to export data to the central facility 110. For example, the timer 212 may be a countdown timer to trigger data exportation every two hours. When two hours has elapsed, the exporter 210 exports any activity data and/or corresponding user identifiers collected and/or determined in that two hours. Alternatively, the data may be exported whenever an available collection site is detected as described in U.S. Pat. No. 8,023,882, which is hereby incorporated by reference in its entirety.

While an example manner of implementing the computing device 102 and meter 108 of FIG. 1 is illustrated in FIG. 2, one or more of the elements, processes and/or devices illustrated in FIG. 2 may be combined, divided, re-arranged, omitted, eliminated and/or implemented in any other way. Further, the example user identification logic 109, the example sensor(s) 202, the example database 204, the example activity data collector 206, the example timestamper 208, the example exporter 210, the example timer 212, and/or, more generally, the example computing device 102 and/or meter 108 of FIG. 2 may be implemented by hardware, software, firmware and/or any combination of hardware, software and/or firmware. Thus, for example, any of the example user identification logic 109, the example sensor(s) 202, the example database 204, the example activity data collector 206, the example timestamper 208, the example exporter 210, the example timer 212, and/or, more generally, the example computing device 102 and/or meter 108 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example user identification logic 109, the example sensor(s) 202, the example meter 108, the example database 204, the example activity data collector 206, the example timestamper 208, the example exporter 210, and/or the example timer 212 are hereby expressly defined to include a tangible computer readable storage device or storage disc such as a memory, DVD, CD, Blu-ray, etc. storing the software and/or firmware. Further still, the example computing device of FIG. 1 may include one or more elements, processes and/or devices in addition to, or instead of, those illustrated in FIG. 2, and/or may include more than one of any or all of the illustrated elements, processes and devices.

Figure 3:
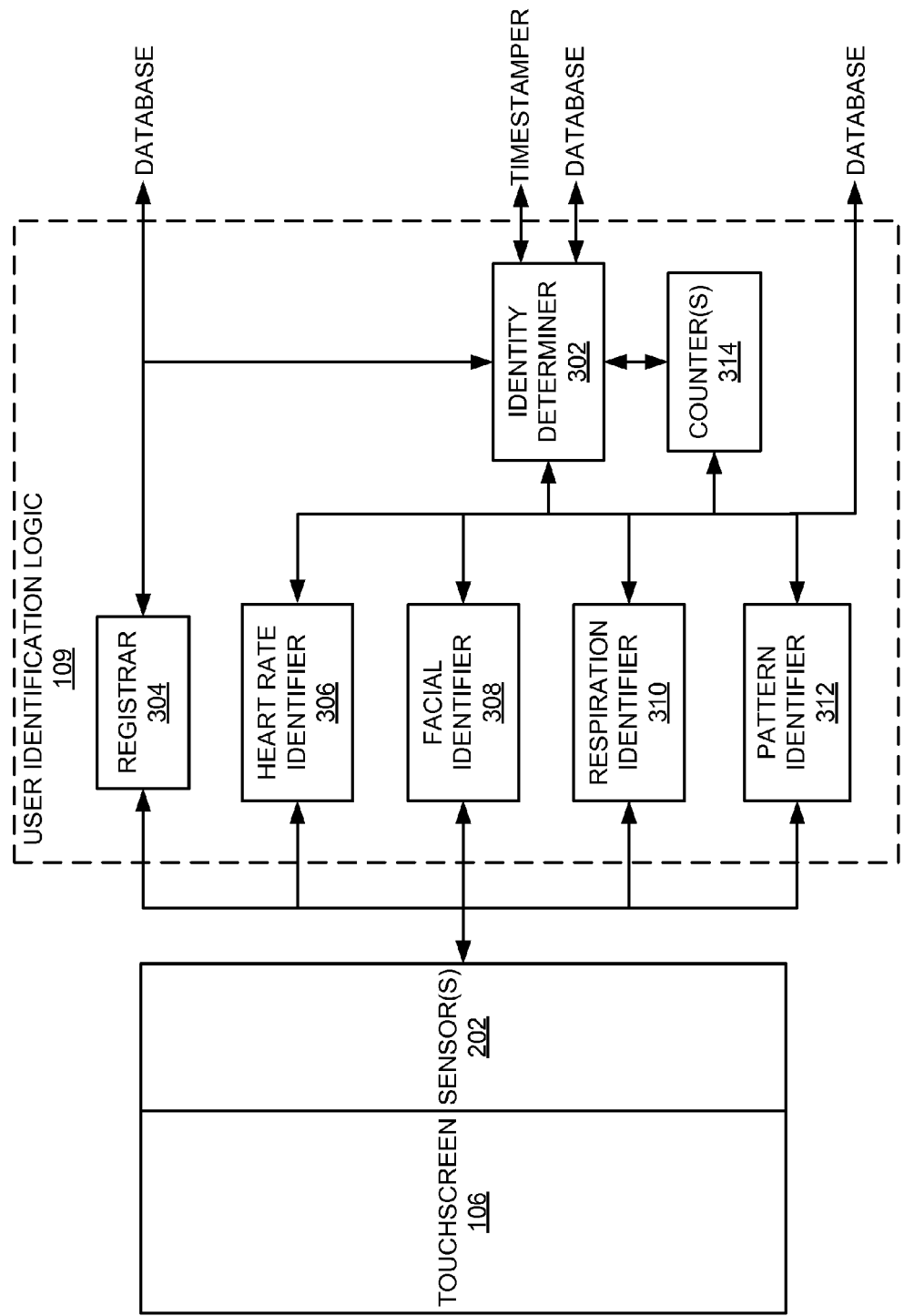
FIG. 3 illustrates an example implementation of the user identification logic of FIG. 2.

FIG. 3 is a block diagram of an example implementation of the user identification logic 109 of FIG. 2. In the illustrated example, the user identification logic 109 automatically identifies the user 104 of the computing device 102 as the user 104 interacts with the computing device 102 for a purpose different than user identification (e.g., web browsing, game playing, etc.). In the illustrated example, the user identification logic 109 includes an identity determiner 302, a registrar 304, a heart rate identifier 306, a facial identifier 308, a respiration identifier 310, a pattern tracker 312, and counter(s) 314.

The identity determiner 302 of the illustrated example is used to identify the user 104 based on body characteristic(s) and/or usage pattern(s) of the user 104 collected as the user 104 operates the computing device 102. When the user 104 agrees to participate in an audience measurement panel, the user 104 is required to complete a registration process. During the registration process, the registrar 304 prompts the user 104 (e.g., via a display on the touchscreen 106, audible instructions output by a speaker, flashing lights, etc.) to input a user identifier and/or password. The identifier may be a user name, an identification code (e.g., a series of numbers), a birth date, and/or any other input that may be used to identify the user 104. The user 104 enters the identifier via the touchscreen 106 and the registrar 304 receives the identifier. The registrar 304 passes the identifier to the identity determiner 302 and the identity determiner 302 passes the identifier to a database (e.g., the database 204 of FIG. 2) for storage. In some examples, the registrar 304 assigns a username or identifier to the user and/or the registrar 304 is not part of the user identification logic 109, but instead is part of the central facility of the audience measurement entity.

Once the user 104 has entered the identifier via the touchscreen 106, the registrar 304 of the illustrated example prompts the user 104 to take certain actions to enable the collection of body characteristic data and/or usage pattern data to be used as references when seeking to possibly identify the user later. Sensor(s) (e.g., sensor(s) 202 of FIG. 2) are used to capture the body characteristic data and/or usage pattern data as the user interacts with the device 102. The heart rate identifier 306, the facial identifier 308, the respiration identifier 310, and/or the pattern tracker 312 receive the captured body characteristic data and/or usage pattern data from the sensor(s) 202 and store the captured body characteristic data and/or usage pattern data and/or data derived from the body characteristic data and/or the usage pattern data in association with the identifier of the user 104.

The heart rate identifier 306 of the illustrated example determines the heart rate of the user 104. The facial identifier 308 of the illustrated example determines a facial characteristic such as a shape of the user 104. The respiration identifier 310 of the illustrated example determines respiration characteristic(s) (e.g., a cough pattern, a sneeze pattern, a breathing pattern, breath rate, breath volume, etc.) associated with the user 104. The pattern identifier 312 of the illustrated example analyzes a typing sample and/or other usage sample to determine touch pressures, typing or stroke speeds, typing or stroke accelerations or decelerations, typing paths, holding patterns, etc. associated with the user 104. Other identifications may also be performed. For example, a motion sensor may detect tremors, vibration, and/or other involuntary and/or habitual movements of the user.

Once the heart rate identifier 306, the facial identifier 308, the respiration identifier 310, and/or the pattern identifier 312 of the illustrated example have collected and/or determined the body characteristic data and/or usage pattern data, the body characteristic data and/or usage pattern data are sent to the identity determiner 302. The identity determiner 302 of the illustrated example sends the body characteristic data and/or usage pattern data to the database 204 for storage in association with the user identifier of the user 104. Subsequently, the identity determiner 302 uses body characteristic data and/or usage pattern data captured and/or determined by the heart rate identifier 306, the facial identifier 308, the respiration identifier 310, and/or the pattern identifier 312 to automatically identify the user 104 as the user 104 is interacting with the computing device 102.

As the software meter 108 running on the computing device 102 collects activity data (e.g., media identification data) representative of activity of the user 104 operating the computing device 102, the user identification logic 109 detects body characteristic data and/or usage pattern data of the user 104 using the sensor(s) 202. As the user 104 types on and/or uses the touchscreen 106 of the computing device 102, the sensor(s) 202 of the illustrated example detect and/or capture body characteristic and/or usage pattern data. Body characteristic and/or usage pattern data includes images representative of the face of the user 104, heart rates of the user 104, audio representative of a cough of the user 104, audio representative of a sneeze of the user 104, breathing rates of the user 104, audio representative of breathing patterns of the user 104, images representative of the finger(s) of the user 104, touch pressures of the user 104, typing or stroke speeds of the user 104, typing or stroke accelerations or decelerations of the user 104, typing paths of the user 104, holding orientation and/or movement patterns of the user 104, typing patterns of the user 104, involuntary movements of the user 104, etc. The body characteristic and/or usage pattern data is sent to the heart rate identifier 306, the facial identifier 308, the respiration identifier 310, and/or the pattern identifier 312 to collect and/or analyze the body characteristic(s) and/or usage pattern(s) of the user 104. In some examples, the body characteristic and/or usage pattern data may be timestamped to facilitate analysis of the data. The heart rate identifier 306 of the illustrated example processes the collected data to determine heart rates and/or heartbeat patterns. The facial identifier 308 of the illustrated example processes facial images to determine facial characteristics, facial shapes, etc. The respiration identifier 310 of the illustrated example processes the audio data to identify respiration characteristics such as cough patterns, sneeze patterns, breathing patterns, etc. The pattern identifier 312 of the illustrated example processes the typing and/or other usage characteristics (e.g., finger dragging, finger position, etc.) to determine typing and/or other usage patterns (e.g., touch pressures, typing or stroke speeds, typing or stroke accelerations or decelerations, typing paths, holding orientation and/or mount patterns, etc.). For example, the pattern identifier 312 may determine that the user 104 drags a second finger (e.g., a pinky finger) on the touchscreen 106 while typing with a first finger (e.g., an index finger).

The data collected by the heart rate identifier 306, the facial identifier 308, the respiration identifier 310, and the pattern identifier 312 of the illustrated example is used to attempt to identify the user 104. The heart rate identifier 306, the facial identifier 308, the respiration identifier 310, and the pattern identifier 312 determine if collected body characteristic data and/or usage pattern data are known by attempting to match the collected body characteristic data and/or usage pattern data with reference body characteristic data and/or reference usage pattern data stored in the database 204 (e.g., body characteristics and/or usage patterns that were collected and associated with a user during the registration process and/or learned over time during a training period in which users are required and/or periodically prompted to enter the username and/or password). In some examples, the matching process may involve representing image(s) as vectors and matching the vectors. In some examples, the matching process may involve representing audio as signatures and matching the signatures. Any other representation and/or matching technology(ies) may additionally or alternatively be used.

In the illustrated example, the identity determiner 302 of the example user identification logic 109 of FIG. 3 uses the counters 314 to identify the user 104 based on the collected body characteristic data and/or usage pattern data. In some examples, a set of counters is maintained for each known user of the computing device 102. For example, a first set of counters including a first heart rate counter, a first facial image counter, a first respiration type counter, a second respiration type counter, a first usage type counter, a second usage type counter and a third usage type counter is maintained for a first user registered as a user of the computing device 102. A second set of counters including a second heart rate counter, a second facial image counter, a third respiration type counter, a fourth respiration type counter, a fourth usage type counter, a fifth usage type counter and a sixth usage type counter is maintained for a second user registered as a user of the computing device 102. In some such examples, the counters 314 in the first set are periodically or aperiodically summed. Likewise, the counters 314 in the second set are periodically or aperiodically summed. The sums of the first and second sets are compared and the user corresponding to the higher sum (e.g., sum for the first set or the second set) is identified as the user. In other examples, the counters 314 are continuously summed and as soon as a sum exceeds a threshold, the user corresponding to that sum is identified as the user, the counters 314 are reset to zero, and the counts begin again.

To determine if the collected heart rate is known, the heart rate identifier 306 of the illustrated example compares the collected heart rate to reference heart rates stored in the database 204. If the collected heart rate is substantially similar, for example, to a stored heart rate, the heart rate identifier 306 determines that the collected heart rate is known and increments a heart rate counter 314 for a user corresponding to the matching reference heart rate to record the match.

The facial identifier 308 of the illustrated example determines if the facial characteristics or facial shapes of the collected facial image is known. To determine if the collected facial image is known, the facial identifier 308 compares the collected facial image to reference facial images stored in the database 204. If the collected facial image is substantially similar to a stored facial image, the facial identifier 308 determines that the collected facial image is known and increments a facial image counter 314 for a user corresponding to the matching reference facial image to record the match.

The respiration identifier 310 of the illustrated example determines if the respiration characteristics (e.g., cough patterns, sneeze patterns, breathing patterns, etc.) are known. To determine if the respiration characteristics are known, the respiration identifier 310 compares determined respiration characteristics to respiration characteristics stored in the database 204. If a determined respiration characteristic is substantially similar to a stored respiration characteristic, the respiration tracker 310 determines that the determined respiration characteristic is known and increments a respiration characteristic counter 314 for a user corresponding to the matching reference respiration characteristic to record the match. If different respiration characteristics are matched (e.g., breath rate and cough), corresponding different respiration characteristic counters are incremented for each corresponding respiration characteristic match determined. In other examples, one respiration counter is used and it is incremented every time any type of respiration match is detected (e.g., the same respiration counter is incremented once for a breath rate match and once again for a cough match).

The pattern identifier 312 of the illustrated example determines if the typing and/or other usage pattern is known. Typing and/or other usage patterns may include, for example, touch pressures, typing or stroke speeds, typing or stroke accelerations or decelerations, typing paths, holding patterns, typing patterns (e.g., dragging a second finger while typing with a first finger). To determine if the determined typing and/or other usage patterns are known, the pattern identifier 312 of the illustrated example compares the determined typing and/or other usage patterns to reference typing and/or other usage patterns stored in the database 204. If a determined pattern is substantially similar to a stored pattern, the pattern identifier 312 determines that the determined pattern is known and increments a pattern counter 314 for a user corresponding to the matching reference pattern. In some examples, the pattern counter is incremented for each typing and/or usage pattern determined to be known. In some examples, different counters track respectively different usage patterns (e.g., one counter tracks typing rate, a second counter tracks finger dragging, etc.).

Periodically or aperiodically, the identity determiner 302 sums the counters 314 for each corresponding user. For example, the heart rate counter 314, the facial image counter 314, and the respiration counter(s) 314 for a first user may each have been incremented once whereas only the usage counter 314 may have been incremented once for a second user. The identity determiner 302 sums the counters 314 for the first user and sums the counter for the second user. The identity determiner 302 determines that the first user has a counter sum of "3" and the second user has a counter sum of "1." Once the identity determiner 302 sums the counters 314 for each corresponding user, the identity determiner 302 determines that the identity of the user 104 is the user with the highest total counter sum. In the above example, the first user has a larger total count (3) than the second user (1) and, thus, the identity determiner 302 determines that the person using the computing device 102 is the first user.

In some examples, the counters are weighted. For instance, if a sneeze pattern is considered more reliable than a heart rate, the heart rate counter may be multiplied by a value less than one prior to the summation of the counters to reduce the impact of the heart rate counter on the final determination relative to the respiration counter. In some examples, the final counts are compared to a threshold (e.g., five) and if no counter sum has a total count above the threshold, the determination is considered inconclusive. In such circumstances, the identification process may be restarted (with or without resetting the counters) and/or the user may be prompted to self-identify on a pop-up login window. Any data collected can then be added to the database 204 for the self-identified user (who may be a new user) to facilitate improved passive identification in the future.

Once the identity determiner 302 of the illustrated example determines the identity of the user 104, the identity determiner 302 clears the counters in preparation for another user identification attempt and sends the identifier of the user 104 (e.g., the user identifier stored in association with the corresponding person identified as the current user to the timestamper 208 to be timestamped. The identifier is associated with corresponding activity data (e.g., media identification data), stored, and/or exported to a central facility (e.g., the central facility 110) for further processing.

While an example manner of implementing the user identification logic 109 of FIG. 2 is illustrated in FIG. 3, one or more of the elements, processes and/or devices illustrated in FIG. 3 may be combined, divided, re-arranged, omitted, eliminated and/or implemented in any other way. Further, the example identity determiner 302, the example registrar 304, the example heart rate identifier 306, the example facial identifier 306, the example respiration identifier 310, the example pattern identifier 312, the example counter(s) 314, and/or, more generally, the example computing device user identification logic 109 of FIG. 3 may be implemented by hardware, software, firmware and/or any combination of hardware, software and/or firmware. Thus, for example, any of the example identity determiner 302, the example registrar 304, the example heart rate identifier 306, the example facial identifier 306, the example respiration identifier 310, the example pattern identifier 312, the example counter(s) 314, and/or, more generally, the example computing device user identification logic 109 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example identity determiner 302, the example registrar 304, the example heart rate identifier 306, the example facial identifier 306, the example respiration identifier 310, the example pattern identifier 312, and/or the example counter(s) 314 are hereby expressly defined to include a tangible computer readable storage device or storage disc such as a memory, DVD, CD, Blu-ray, etc. storing the software and/or firmware. Further still, the example user identification logic 109 of FIG. 2 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example computing device 102 of FIG. 2 and/or the example user identification logic 109 of FIG. 3 are shown in FIGS. 4, 5A, 5B, and 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 4, 5A, 5B, and 6, many other methods of implementing the example computing device 102 and/or the example user identification logic 109 may alternatively be used. For example, the order of execution of the blocks may be changed, and/or some of the blocks described may be changed, eliminated, or combined.

As mentioned above, the example processes of FIGS. 4, 5A, 5B, and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4, 5A, 5B, and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

Figure 4:
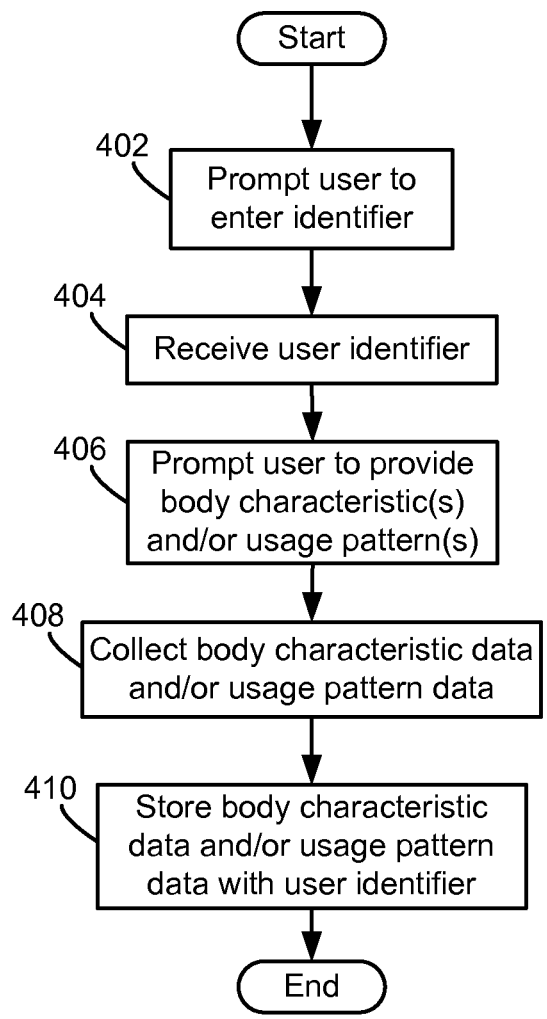
FIG. 4 is a flow diagram representative of example machine readable instructions that may be executed to implement the example computing device and the example meter of FIG. 2 and the example user identification logic of FIG. 3 to register a user for participation in an audience measurement panel.

FIG. 4 is a flow diagram representative of example machine readable instructions that may be executed to implement the example computing device 102 and the example meter 108 of FIG. 2 and/or the example user identification logic 109 of FIG. 3 to register a user (e.g., the user 104) for participation in an audience measurement panel.

When the user 104 agrees to participate in an audience measurement panel, the user 104 is required to complete a registration process. During the registration process, the registrar 304 prompts the user 104 (via, for example, a display on the touchscreen 106, audible instructions output by a speaker, flashing lights, etc.) to input a user identifier and/or password (block 402). The user 104 enters the user identifier via the touchscreen 106 and the registrar 304 receives the identifier and/or password (block 404). The registrar 304 passes the identifier to the identity determiner 302 and the identity determiner 302 passes the identifier to a database (e.g., the database 204 of FIG. 2) for storage (e.g., locally with the computing device and/or remotely at the central facility). Storing the data at the central facility has the advantage of allowing the identifier to be used to identify the user(s) on more than one computing device.

Once the user 104 has entered the identifier via the touchscreen 106, the registrar 304 prompts the user 104 to take certain actions to enable the collection of body characteristic data and/or usage pattern data (block 406). For example, the registrar 304 prompts the user 104 to input and/or provide a heart rate sample, a facial photograph, a cough sample, a sneeze sample, a breathing sample, a typing and/or other usage sample, etc. The sensor(s) 202 capture the body characteristic data and/or usage pattern data and pass the data to the heart rate identifier 306, the facial identifier 308, the respiration identifier 310, and/or the pattern identifier 312 to store and/or analyze the body characteristic data and/or usage pattern data and/or data derived from the body characteristic data and/or the usage pattern data (block 408). For example, the heart rate identifier 306 determines the heart rate of the user 104. The facial identifier 308 determines facial characteristics or shapes of the user 104. The respiration identifier 310 determines respiration characteristic(s) (e.g., cough patterns, sneeze patterns, breathing patterns, a tremor, a twitch, etc.) associated with the user 104. The pattern identifier 312 determines typing and/or other usage patterns (e.g., touch pressure(s), typing or stroke speed(s), typing or stroke acceleration(s) or deceleration(s), typing path(s), holding pattern(s), typing pattern(s), etc.) associated with the user 104.

Once the heart rate identifier 306, the facial identifier 308, the respiration identifier 310, and the pattern identifier 312 have collected and/or determined the body characteristic data and/or usage pattern data of the user 104, the heart rate identifier 306, the facial identifier 308, the respiration identifier 310, and the pattern identifier 312 send the collected body characteristic data and/or usage pattern data to the identity determiner 302. The identity determiner 302 sends the collected body characteristic data and/or usage pattern data to the database 204 for storage in association with the user identifier of the user 104 (block 410). Thereafter, the user identification logic 109 uses body characteristic data and/or usage pattern data collected during the registration process to identify the user 104 as the user 104 is interacting with the computing device 102 (e.g., not self-identifying).

Figure 5A:
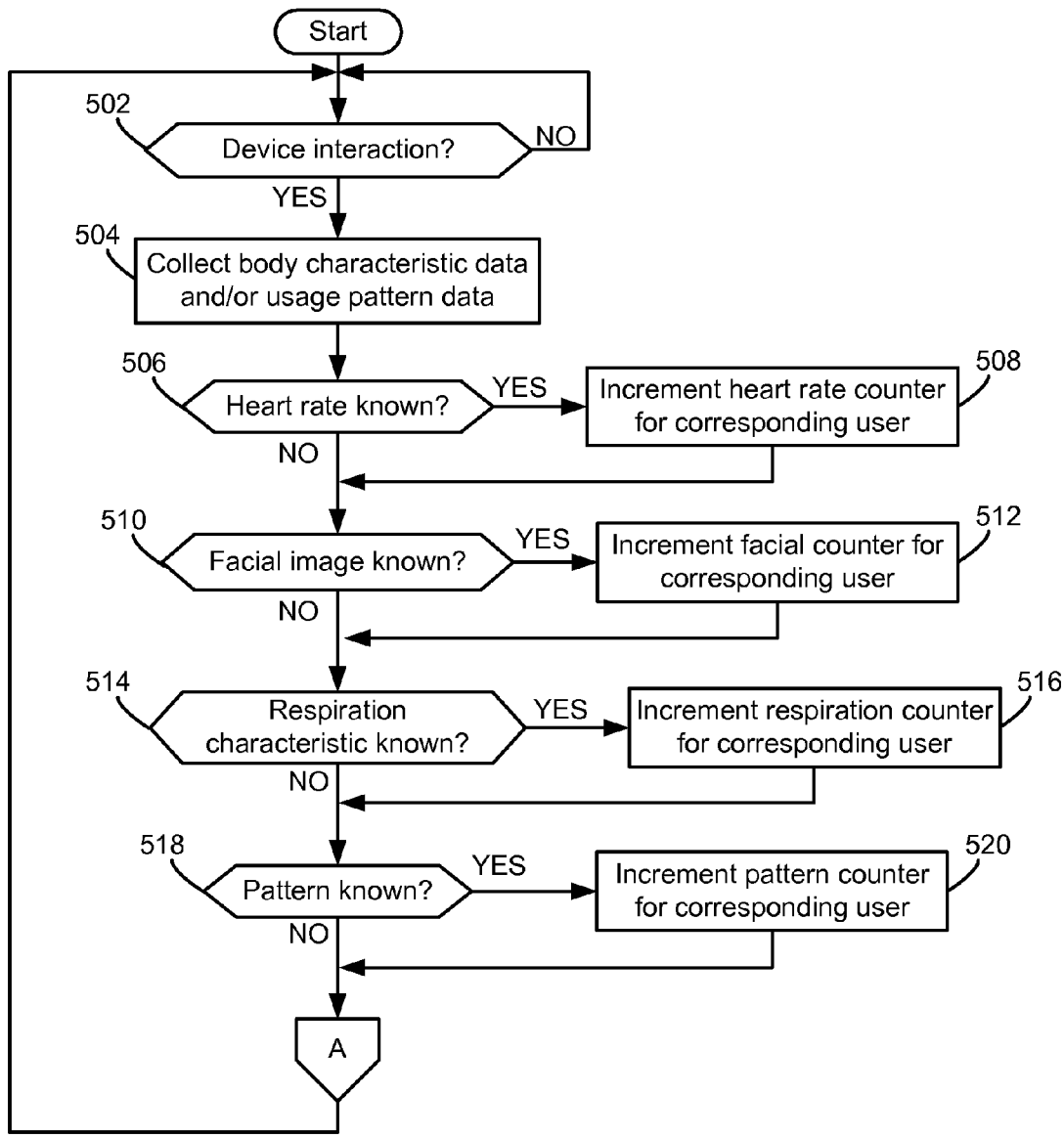
FIGS. 5A and 5B collectively provide a flow diagram representative of example machine readable instructions that may be executed to implement the example computing device of FIG. 2 and the example user identification logic of FIG. 3 to identify a user participating in an audience measurement panel.
Figure 5B:
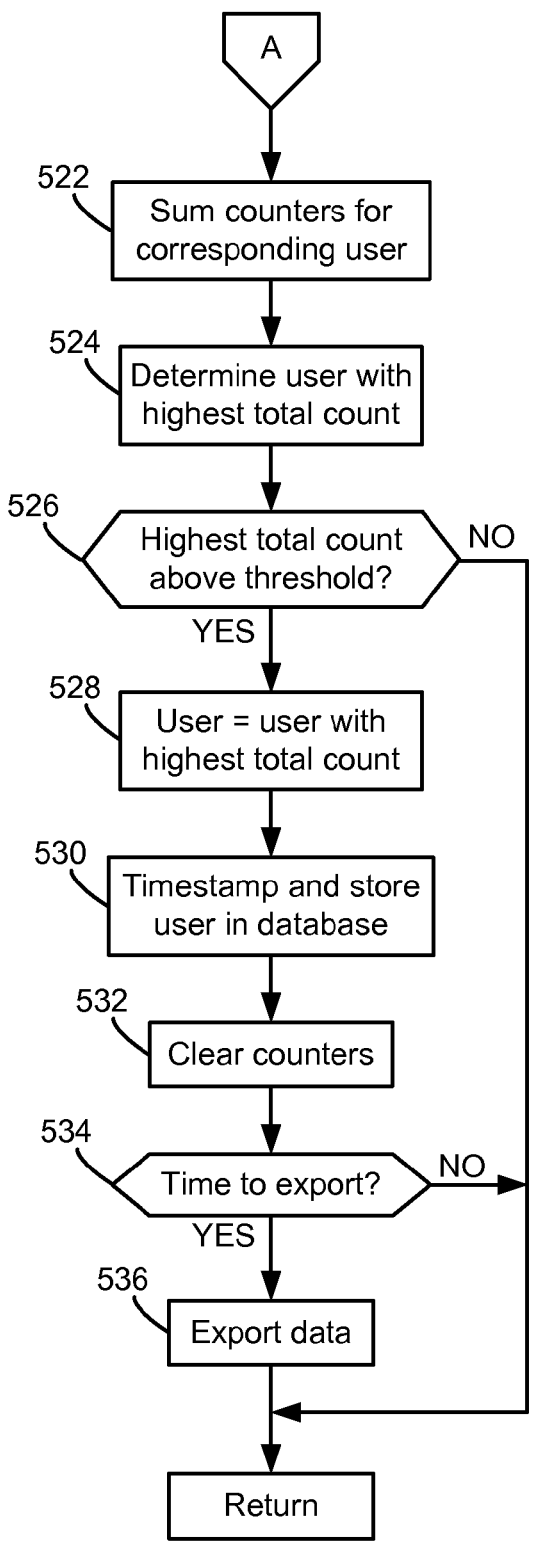

FIGS. 5A and 5B are a flow diagram representative of example machine readable instructions that may be executed to implement the example computing device 102 of FIG. 2 and the user identification logic 109 of FIG. 3 to identify a user (e.g., the user 104 of FIG. 1) participating in an audience measurement panel. The user identification logic 109 of the computing device 102 passively collects body characteristic data and/or usage pattern data as the software meter 108 running on the computing device 102 collects activity data (e.g., media identification data) representative of activity of the user 104 on the computing device 102 (e.g., as the user 104 operates the computing device 102).

Initially, the user identification logic 109 determines if there is computing device 102 interaction (e.g., if the user 104 is using the computing device 102) using the sensor(s) 202 (block 502). For example, if the sensor(s) 202 detect a user holding the computing device 102 and/or if the sensor(s) 202 detect typing and/or strokes on the touchscreen 106, the user identification logic 109 determines that there is computing device 102 interaction. If there is no computing device 102 interaction, control remains at block 502 until there is such interaction.

Once the user identification logic 109 detects computing device 102 interaction, the user identification logic 109 collects body characteristic data and/or usage pattern data associated with the user 104 (block 504) using the sensor(s) 202. As the user 104 interacts with the computing device 102 (e.g., types on the touchscreen 106 of the computing device 102), the sensor(s) 202 collect body characteristic data and/or usage pattern data and pass the data to the heart rate identifier 306, the facial identifier 308, the respiration identifier 310, and/or the pattern identifier 312. The heart rate identifier 306 of the illustrated example analyzes the body characteristic data and/or usage pattern data to attempt to determine a heart rate. The facial identifier 308 of the illustrated example analyzes the body characteristic and/or usage pattern data to attempt to determine a facial image. The respiration identifier 310 of the illustrated example analyzes the body characteristic and/or usage pattern data to attempt to determine respiration characteristics (e.g., cough patterns, sneeze patterns, breathing patterns, etc.). The pattern identifier 312 analyzes the body characteristic and/or other usage pattern data to attempt to determine typing and/or other usage patterns (e.g., touch pressure(s), typing or stroke speed(s), typing or stroke acceleration(s) or deceleration(s), typing path(s), holding pattern(s), typing pattern(s), involuntary movements of the user, etc.).

The heart rate identifier 306, the facial identifier 308, the respiration identifier 310, and the pattern identifier 312 of the illustrated example attempt to facilitate identification of the user 104 by attempting to match collected body characteristic data and/or usage pattern data with reference body characteristic data and/or reference usage pattern data stored in the database 204. In the illustrated example, the user identification logic 202 uses the counters 314 to identify the user 104 based on the collected body characteristic data and/or usage pattern data.

To begin the matching process, the example heart rate identifier 306 determines if a collected heart rate is known (block 506). To determine if the collected heart rate is known, the heart rate identifier 306 compares the collected heart rate to reference heart rates stored in the database 204. If the collected heart rate is substantially similar, for example, to a stored heart rate, the heart rate identifier 306 increments a heart rate counter 314 for a corresponding user (block 508) to record the match. If the heart rate is not known, control proceeds to block 510 without incrementing a counter.

The example facial identifier 308 determines if facial characteristics and/or shapes of the collected facial image are known (block 510). To determine if the collected facial image is known, the facial identifier 308 compares the facial characteristics and/or shapes of the collected facial image to reference facial images stored in the database 204. If the collected facial characteristics and/or shapes are substantially similar to a stored facial image, the facial identifier 308 determines that the collected facial image is known and increments a facial image counter 314 for a corresponding user (block 512) to record the match. If the facial image is not known, control proceeds to block 518 without incrementing a counter.

The example respiration counter 310 determines if respiration characteristic(s) (e.g., cough patterns, sneeze patterns, breathing patterns, etc.) are known (block 514). To determine if a respiration characteristic is known, the respiration identifier 310 compares the respiration characteristic to reference respiration characteristics stored in the database 204. If the respiration characteristic is substantially similar to a stored respiration characteristic, the respiration identifier 310 increments a respiration characteristic counter 314 for a corresponding user (block 516) to record the match. In the illustrated example, one respiration characteristic counter is used and it is incremented every time any type of respiration match is detected. If the respiration characteristic is not known, control proceeds to block 518 without incrementing a counter.

The pattern identifier 312 determines if typing and/or other usage patterns are known (block 518). To determine if a typing and/or other usage pattern is known, the pattern identifier 312 compares the typing and/or other usage pattern to reference typing and/or other usage patterns stored in the database 204. If the determined pattern is substantially similar to a stored pattern, the pattern identifier 312 increments a pattern counter 314 for a corresponding user (block 520). In the illustrated example, one pattern counter is used and it is incremented every time any type of pattern match is detected. If the typing and/or usage pattern is not known, control proceeds to block 522 without incrementing a counter.

Periodically or aperiodically, for example, after a threshold number of tracks (e.g., performed X number of evaluations, and/or a predetermined amount of time has passed (e.g., one minute)), the identity determiner 302 sums the counters for each corresponding user (block 522). In some examples, the counters are weighted. For instance, if a sneeze pattern is considered more reliable than a heart rate, the heart rate counter may be multiplied by a value less than one prior to the summation of the counters to reduce the impact of the heart rate counter on the final determination relative to the respiration characteristic counter.

Once the identity determiner 302 sums the counters 314 for each corresponding user, the identity determiner 302 determines the user with the highest total counter sum (block 524). The identity determiner 302 then compares the highest total counter sum to a threshold (block 526). In the illustrated example, if the highest total counter sum is not above the threshold (e.g., five), the identification determination is considered inconclusive and control returns to block 502 and the user identification logic 202 continues to collect body characteristic data and/or usage pattern data to identify the user 104. In the illustrated example, the identification process is restarted without resetting the counters. In other examples, the identification process may be restarted after resetting the counters. In some examples, the user may be prompted to self-identify on a pop-up login window. In such examples, any data collected can then be added to the database 204 for the self-identified user (who may be a new user) to facilitate improved passive identification in the future.

If the highest total count is above the threshold, the identity determiner 302 determines that the identity of the user 104 is the user with the highest total counter sum (block 528). Once the identity determiner 302 of the illustrated example determines the identity of the user 104, the identity determiner 302 passes the identifier of the user 104 to the timestamper 208 to be timestamped and the timestamper 208 passes the identifier to the database 204 to be stored (block 530). The identity determiner 302 then clears the counters 314 (block 532).

The exporter 210 receives the identifier from the database 204 and uses the timer 212 to determine if it is time to export data to the central facility 110 (block 534). If the timer 212 has lapsed indicating it is time to export the data, the exporter 210 exports the user identifier and/or collected activity data (e.g., media identification data) to the central facility 110 (block 536). If the timer 212 has not lapsed, control returns to block 502 and the user identification logic 202 continues to collect body characteristic data and/or usage pattern data to identify the user 104.

Figure 6:
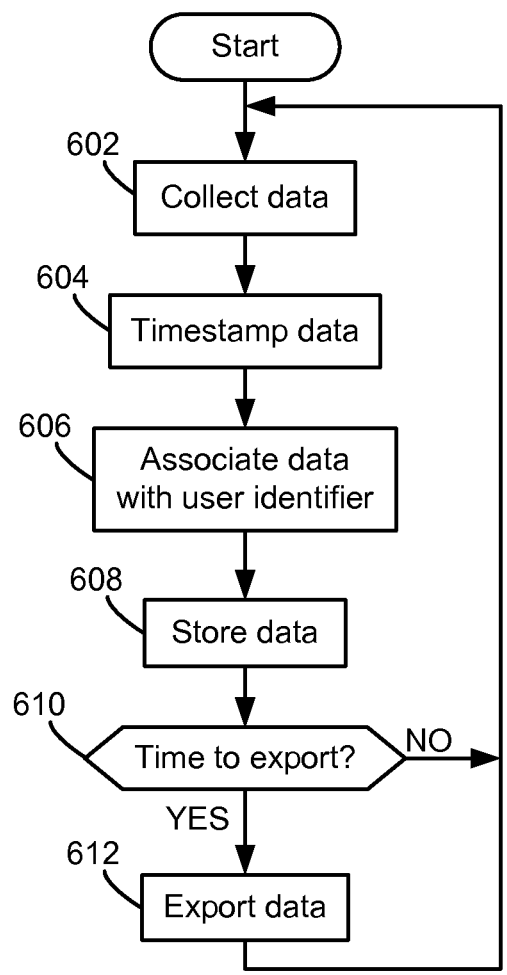
FIG. 6 is a flow diagram representative of example machine readable instructions that may be executed to implement the example computing device of FIG. 2 to collect activity data for audience measurement.

FIG. 6 is a flow diagram representative of example machine readable instructions that may be executed to implement the example computing device 102 of FIG. 2 to collect activity data from the computing device 102. The computing device 102 monitors and/or collects activity data (e.g., media identification data) related to, for example, Internet activity, application use, etc. based on interaction of the user 104 with the computing device 102.

The activity data collector 206 of the illustrated example monitors activity of the user 104 on the computing device 102. The activity data collector 206 may monitor, for example, Internet activity (e.g., URLs visited, web pages visited, etc.), data sent and/or received, games played, media viewed, applications downloaded, advertisements selected, etc. The activity data collector 206 of the illustrated example collects data related to the activity of the user 104 (block 602) and passes the collected data to the timestamper 208. The timestamper 208 of the illustrated example timestamps the collected activity data (block 604) and passes the collected activity data to the database 204. The database 204 associates collected activity data with the identifier of the user 104 determined by the user identification logic 202 (block 606) based on their respective timestamps. For example, activity data collected at a certain time is determined to be associated with the user 104 identified at that same time. The database 204 stores the collected activity data in connection with the corresponding user identifier (block 608). The database 204 of the illustrated example passes the timestamped activity data and the timestamped corresponding user identifier to the exporter 210. The exporter 210 receives the activity data and the user identifier from the database 204 and uses the timer 212 to determine if it is time to export data to the central facility 110 (block 610). If the timer 212 has lapsed indicating it is time to export the data, the exporter 210 exports the user identifier and/or collected activity data to the central facility 110 (block 612). If the timer 212 has not lapsed, control returns to block 602 and the activity data collector 206 continues to collect activity data of the user 104.

Figure 7:
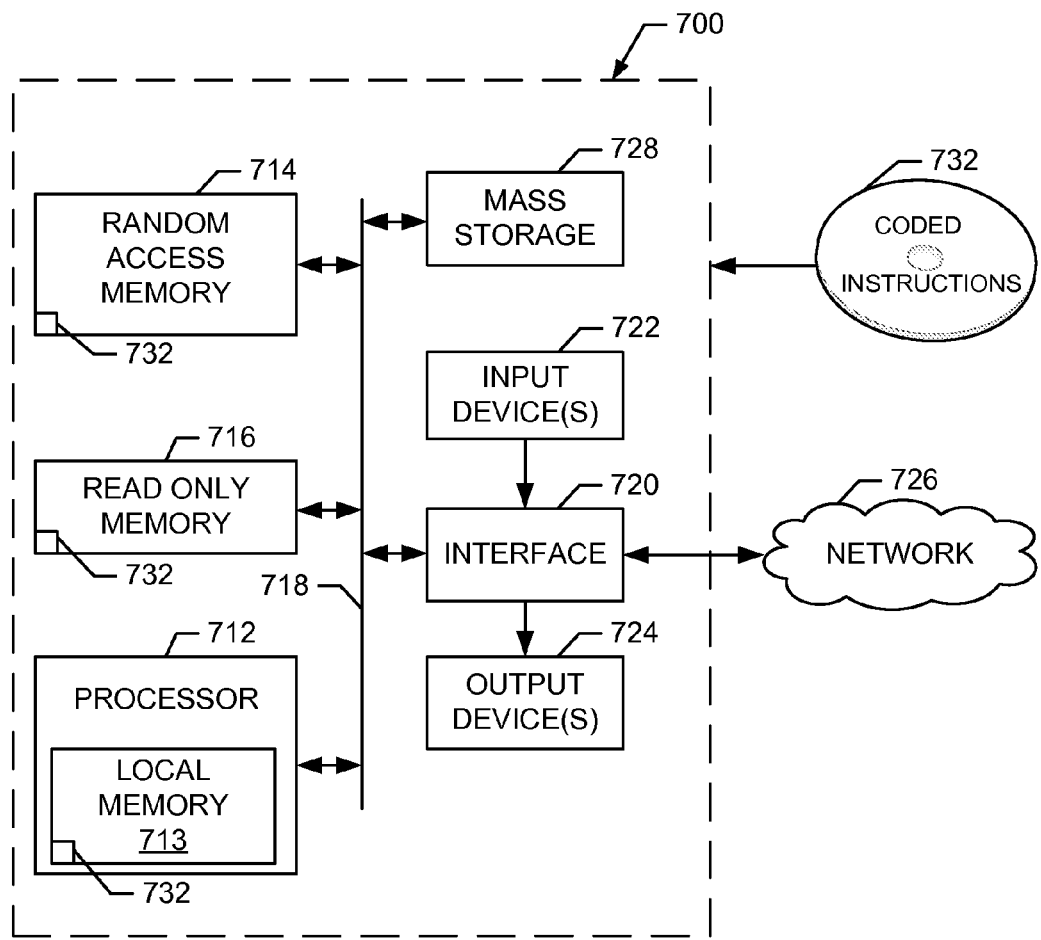
FIG. 7 is a block diagram of an example processor platform that may be used to execute the instructions of FIGS. 4, 5A, 5B, and/or 6 to implement the example computing device of FIG. 2, the example user identification logic of FIG. 3, and/or, more generally, the example system of FIG. 1.

FIG. 7 is a block diagram of an example processor platform 700 capable of executing the instructions of FIGS. 4, 5A, 5B, and/or 6 to implement the example computing device 102 and the example meter 108 of FIG. 2, the example user identification logic 109 of FIG. 3, and/or, more generally, the example system 100 of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit a user to enter data and commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciated that the methods, apparatus, and articles of manufacture have been disclosed to automatically identify a user of a computing device such as a notebook, tablet, and or Apple® iPad so that the user's demographics may be associated with activity data (e.g., media identification data) collected during the user's interaction with the computing device. In disclosed examples, the identity of the user is determined as the user interacts with (e.g., handles, touches) the computing device for a purpose different from user identification. Such examples enable passive user identification (e.g., the user is not required to actively identify himself).

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method of identifying a user comprising:
   capturing an image of a user via a sensor on a computing device, the image being captured as the user interacts with the computing device for a purpose different from user identification;
   analyzing the image to determine a seating position of the user;
   determining an identifier associated with the user based on at least the seating position of the user;
   collecting, via the computing device, activity data identifying media to which the user is exposed; and
   associating the media with the identifier of the user.

2. The method of claim 1, wherein determining the identifier is further based on body characteristic data associated with the user including at least one of a heart rate, a cough pattern, a sneeze pattern, a breathing pattern, a touch pressure, an involuntary movement, or a habitual movement.

3. The method of claim 2, further including capturing usage pattern data, wherein determining the identifier is based on the seating position of the user, the body characteristic data, and the usage pattern data.

4. The method of claim 3, wherein the capturing of the usage pattern data includes detection of at least one of a typing speed, a typing acceleration, a typing deceleration, a typing path, a holding pattern, a device mount, a typing pattern, or the user dragging a second finger when using the computing device with a first finger.

5. The method of claim 1, wherein the computing device includes at least one of a mobile device, a tablet computer, a touchscreen device or a touchless touchscreen device.

6. The method of claim 1, wherein the sensor includes at least one of a camera, an accelerometer, a gyroscope, a compass, a cardiograph, a motion sensor, or a microphone.

7. The method of claim 1, further including exporting the activity data and the identifier to a collection site.

8. The method of claim 2, wherein determining the identifier associated with the user based on the captured body characteristic data includes:
incrementing one or more counters when the body characteristic data matches reference body characteristic data;
summing values of the one or more counters;
comparing the summed values to a threshold; and
identifying the user associated with the reference body characteristic data when the summed values exceed the threshold.

9. A system to identify a user comprising:
a sensor to capture animage of a user, the image being captured as the user interacts with a computing device for a purpose different from user identification;
a user identifier to:
analyze the image to determine a seating position of the user; and
determine an identifier associated with the user based on at least the seating position of the user;
an activity data collector to collect media exposure data representative of media exposed to the user; and
a database to store the media exposure data in association with the identifier of the user.

10. The system of claim 9, wherein the user identifier is further to determine physiological data associated with the user including at least one of a heart rate, a cough pattern, a sneeze pattern, a breathing pattern, a touch pressure, an involuntary movement, or a habitual movement.

11. The system of claim 10, wherein the sensor is to further capture usage pattern data, wherein the user identifier is to determine the identifier based on the seating position, the physiological data, and the usage pattern data.

12. The system of claim 11, wherein the sensor is to capture the usage pattern data by detecting at least one of a typing speed, a typing acceleration, a typing deceleration, a typing path, a holding pattern, a device mount, a typing pattern, or the user dragging a second finger when using the computing device with a first finger.

13. The system of claim 9, wherein the computing device includes at least one of a mobile device, a tablet computer, a touchscreen device or a touchless touchscreen device.

14. The system of claim 9, wherein the sensor includes at least one of a camera, an accelerometer, a gyroscope, a compass, a cardiograph, a motion sensor, or a microphone.

15. The system of claim 9, further including an exporter to export the media exposure data and the identifier to a collection site.

16. The system of claim 10, wherein to determine the identifier associated with the user based on the captured physiological data, the user identifier is to:
increment one or more counters when the physiological data matches reference physiological data;
sum values of the one or more counters;
compare the summed values to a threshold; and
identify the user associated with the reference physiological data when the summed values exceed the threshold.

17. A tangible computer-readable storage medium comprising instructions that, when executed, cause a computing device to at least:
capture an image of a user via a sensor on a computing device, the image being captured as the user interacts with the computing device for a purpose different from user identification;
analyze the image to determine a seating position of the user;
determine an identifier associated with the user based on at least the seating position of the user;
collect, via the computing device, activity data identifying media to which the user is exposed; and
associate the media with the identifier of the user.

18. The computer-readable storage medium of claim 17, wherein the instructions, when executed, cause the computing device to capture body characteristic data associated with the user including at least one of a heart rate, a cough pattern, a sneeze pattern, a breathing pattern, a touch pressure, an involuntary movement, or a habitual movement.

19. The computer-readable storage medium of claim 18, wherein the instructions, when executed, cause the computing device to capture usage pattern data, wherein determining the identifier is based on the seating position of the user, the body characteristic data, and the usage pattern data.

20. The computer-readable storage medium of claim 17, wherein the instructions, when executed, cause the computing device to capture the usage pattern data, the usage pattern data including at least one of a typing speed, a typing acceleration, a typing deceleration, a typing path, a holding pattern, a device mount, a typing pattern, or the user dragging a second finger when using the computing device with a first finger.

21. The computer-readable storage medium of claim 17, wherein the computing device includes at least one of a mobile device, a tablet computer, a touchscreen device or a touchless touchscreen device.

22. The computer-readable storage medium of claim 17, wherein the sensor includes at least one of a camera, an accelerometer, a gyroscope, a compass, a cardiograph, a motion sensor, or a microphone.

23. The computer-readable storage medium of claim 17, wherein the instructions, when executed, cause the computing device to export the activity data and the identifier to a collection site.

24. The computer-readable storage medium of claim 18, wherein the instructions, when executed, cause the computing device to determine the identifier associated with the user based on the captured body characteristic data by:
incrementing one or more counters when the body characteristic data matches reference body characteristic data;
summing values of the one or more counters;
comparing the summed values to a threshold; and
identifying the user associated with the reference body characteristic data when the summed values exceed the threshold.

25. The method of claim 1, wherein the activity data is representative of the user's interaction with an application on the computing device.

26. A method of identifying a first user, the method comprising:
capturing first body characteristic data associated with a first user via a sensor on a computing device, the first body characteristic data including a seating position of the first user and a first body characteristic being captured as the first user interacts with the computing device for a purpose different from user identification;
determining an identifier associated with the first user based on the first body characteristic data;
incrementing a first counter for the first user associated with the identifier at a first time;
incrementing a second counter for a second user when second body characteristic data is indicative of the second user;
collecting, via the computing device, activity data identifying media to which the first user is exposed; and associating the media with the identifier of the first user in response to determining that a value of the first counter is greater than a value of the second counter.

27. A system to identify a user, the system comprising:
a sensor to capture physiological data associated with a first user, the physiological data including a seating position of the first user and the physiological data being captured as the first user interacts with a computing device for a purpose different from user identification;
a user identifier to:
  determine an identifier of the first user based on the physiological data;
  increment a first counter for the first user associated with the identifier at a first time;
  increment a second counter for a second user when second body characteristic data is indicative of the second user; and
  determine if a value of the first counter is greater than a value of the second counter;
an activity data collector to collect media exposure data representative of media exposed to the first user; and
a database to store the media exposure data in association with the identifier of the first user when the user identifier determines that the value of the first counter is greater than the value of the second counter.

28. A tangible computer-readable storage medium comprising instructions that, when executed, cause a computing device to at least:
  capture first body characteristic data associated with a first user via a sensor on a computing device, the first body characteristic data including a seating position of the first user and a first body characteristic being captured as the first user interacts with the computing device for a purpose different from user identification;
  determine an identifier of the first user based on the captured first body characteristic data;
  increment a first counter for the first user associated with the identifier at a first time;
  increment a second counter for a second user when second body characteristic data is indicative of the second user;
  collect activity data identifying media to which the first user is exposed; and
  associate the media with the identifier of the first user in response to determining that a value of the first counter is greater than a value of the second counter.

* * * * *

UNITED STATES PATENT AND TRADEMARK OFFICE
CERTIFICATE OF CORRECTION

PATENT NO. : 9,223,297 B2  
APPLICATION NO. : 13/781236  
DATED : December 29, 2015  
INVENTOR(S) : Christen V. Nielsen Page 1 of 1

It is certified that error appears in the above-identified patent and that said Letters Patent is hereby corrected as shown below:

In The Claims

Column 23, line 14: after "a sensor to capture", replace "animage" with --an image--.

Signed and Sealed this  
Fifteenth Day of March, 2016

Michelle K. Lee  
*Director of the United States Patent and Trademark Office*